(12) United States Patent
Spencer et al.

(10) Patent No.: US 10,414,439 B2
(45) Date of Patent: Sep. 17, 2019

(54) ACTIVE SAFETY ILLUMINATED STEERING WHEEL

(71) Applicant: Key Safety Systems, Inc., Sterling Heights, MI (US)

(72) Inventors: Byron Spencer, Bloomfield Hills, MI (US); Michael Jendrowski, Macomb, MI (US); John Musiol, West Bloomfield, MI (US); Joachim Klesing, Rochester, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 16/067,087

(22) PCT Filed: Dec. 21, 2016

(86) PCT No.: PCT/US2016/067969
§ 371 (c)(1),
(2) Date: Jun. 28, 2018

(87) PCT Pub. No.: WO2017/116898
PCT Pub. Date: Jul. 6, 2017

(65) Prior Publication Data
US 2019/0016383 A1    Jan. 17, 2019

Related U.S. Application Data (60) Provisional application No. 62/274,272, filed on Jan. 2, 2016.

(51) Int. Cl.
*B62D 15/02* (2006.01)
*B62D 1/04* (2006.01)
(Continued)

(52) U.S. Cl.
CPC ............ *B62D 15/029* (2013.01); *B60K 35/00* (2013.01); *B60Q 3/283* (2017.02); *B60Q 9/008* (2013.01); *B62D 1/046* (2013.01); *B62D 1/06* (2013.01); *B60K 2370/178* (2019.05); *B60K 2370/33* (2019.05); *B60K 2370/332* (2019.05); *B60K 2370/338* (2019.05); *B60K 2370/782* (2019.05)

(58) Field of Classification Search
CPC ........ B62D 15/029; B62D 1/046; B62D 1/06; B60Q 3/283; B60Q 9/008; B60K 2350/928; B60K 2350/203
See application file for complete search history.

(56) References Cited

U.S. PATENT DOCUMENTS

| | | | | |
|---|---|---|---|---|
| 4,835,512 A | * | 5/1989 | Bratton | ..................... B60Q 3/14 340/457.2 |
| 5,667,033 A | * | 9/1997 | Shimizu | ............. B62D 15/0265 180/169 |

(Continued)

*Primary Examiner* — Joseph H Feild
*Assistant Examiner* — Rufus C Point
(74) *Attorney, Agent, or Firm* — David L. King; Markell Seitzman (57) ABSTRACT

A steering wheel (102) having a hub portion (118), a rim (112) and at least one spoke (114) connected to the hub portion (118) and to the rim (112), the rim (112) having a groove and a surface of the steering wheel (102); a number of actuatable light sources located in or under the groove; light diffuser or lens (140) positioned in the groove above the light sources.

7 Claims, 6 Drawing Sheets

(51) Int. Cl.
  *B62D 1/06* (2006.01)
  *B60Q 9/00* (2006.01)
  *B60Q 3/283* (2017.01)
  *B60K 35/00* (2006.01)

(56) References Cited

U.S. PATENT DOCUMENTS

| | | | | |
|---|---|---|---|---|
| 5,855,072 A * | 1/1999 | Nakaho | ................ | B62D 15/022 33/1 N |
| 5,949,346 A * | 9/1999 | Suzuki | ................ | B60K 37/02 340/815.45 |
| 6,546,829 B1 * | 4/2003 | Despreaux | ............... | B62D 1/06 74/552 |
| 2004/0130903 A1 * | 7/2004 | Chen | ................ | B60Q 1/0052 362/487 |
| 2005/0021190 A1 * | 1/2005 | Worrell | ................ | B60K 35/00 701/1 |
| 2005/0050981 A1 * | 3/2005 | Warhover | ................ | B62D 1/06 74/552 |
| 2006/0070795 A1 * | 4/2006 | Meissner | ............... | B60K 37/06 180/446 |
| 2008/0143505 A1 * | 6/2008 | Maruyama | ............ | B60K 35/00 340/441 |
| 2009/0096595 A1 * | 4/2009 | Lemasson | ............. | B60W 50/16 340/425.5 |
| 2011/0153160 A1 | 6/2011 | Hesseling | | |
| 2012/0325045 A1 * | 12/2012 | Pekari | .................... | B62D 1/046 74/552 |
| 2013/0263691 A1 * | 10/2013 | Krishnamoorthy | ...... | B62D 1/04 74/552 |
| 2014/0053371 A1 * | 2/2014 | Feinstein | ................ | B25G 1/01 16/430 |
| 2014/0109719 A1 * | 4/2014 | Lisseman | ................ | B60Q 9/00 74/552 |
| 2014/0301097 A1 | 10/2014 | Neumann | | |
| 2014/0328077 A1 * | 11/2014 | Tovar | .................... | B62D 1/046 362/511 |
| 2015/0123947 A1 * | 5/2015 | Jubner | .................... | B62D 1/046 345/175 |
| 2016/0311366 A1 * | 10/2016 | Lisseman | ............ | G02B 6/0085 |
| 2017/0166116 A1 * | 6/2017 | Asakawa | ................ | B60Q 3/80 |
| 2017/0166117 A1 * | 6/2017 | Nagata | ................ | F21V 29/503 |
| 2018/0208111 A1 * | 7/2018 | Lisseman | ................ | B62D 1/046 |

* cited by examiner

ACTIVE SAFETY ILLUMINATED STEERING WHEEL

BACKGROUND AND SUMMARY OF THE INVENTION

As road vehicles become more complex and abundant due to the ubiquity of smaller, faster vehicles with sophisticated electronic devices, the steering wheel (SW) can be called upon to deliver information to and receive direction from the driver. The steering wheel is the most immediate interface with the driver. Computers within or connected to the steering wheel may also operate on such information in ever more complicated ways to enhance vehicle safety.

This invention proposes the installation of a chain of printed circuit boards (PCBs) under the rim of a steering wheel on which electronic input and output devices are mounted. Such devices receive power and data from elsewhere in the vehicle and send data by return. This chain of PCBs is connected to and controlled by at least one digital computer, PLC or similar device. The PCB chain's primary purpose is to provide access to all parts of the rim. In the current invention visible and invisible light are used as the primary input/output medium but other wavelength radio signals can be used or mechanical energy in the form of sound or vibration as is considered as part of the invention.

The present invention includes a steering wheel having a hub portion, a rim and at least one spoke connected to the hub portion and to the rim, the rim having a groove and a surface of the steering wheel; a number of actuatable light sources located in or under the groove; a light diffuser or lens positioned in the groove above the light sources.

DETAILED DESCRIPTION OF THE DRAWINGS

Figure 1:
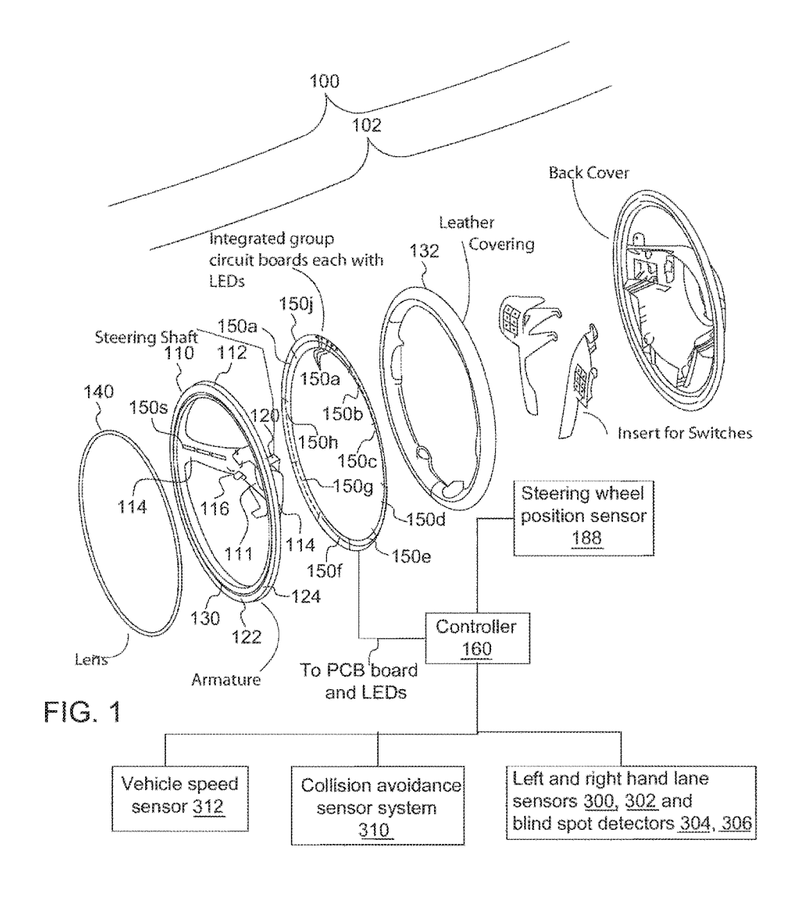
FIG. 1 illustrates an exploded view of one embodiment of the present invention.

FIG. 1 illustrates an exploded view of steering wheel assembly 100. Assembly 100 comprises a steering wheel 102 comprising an armature 110 having a rim 112 and a plurality of spokes 114. The spokes 114 at an end opposite 116 opposite the rim terminate in a hub 118 which is operatively secured to the steering shaft 120. Rim 112 is illustrative of the steering wheel having a split rim with a top rim portion 122 and a bottom rim portion 124. The top rim portion is formed with an annular groove or slot 130. Positioned apart from the armature and its slot 130 is a lens, light guide or light diffuser 140. The lens, light guide or light diffuser can be formed using a translucent or transparent material. The lens may also include an acrylic base covered with a very thin layer of aluminum or chrome which permits the transmission of light while providing an artistically interesting steering wheel.

Figure 2:
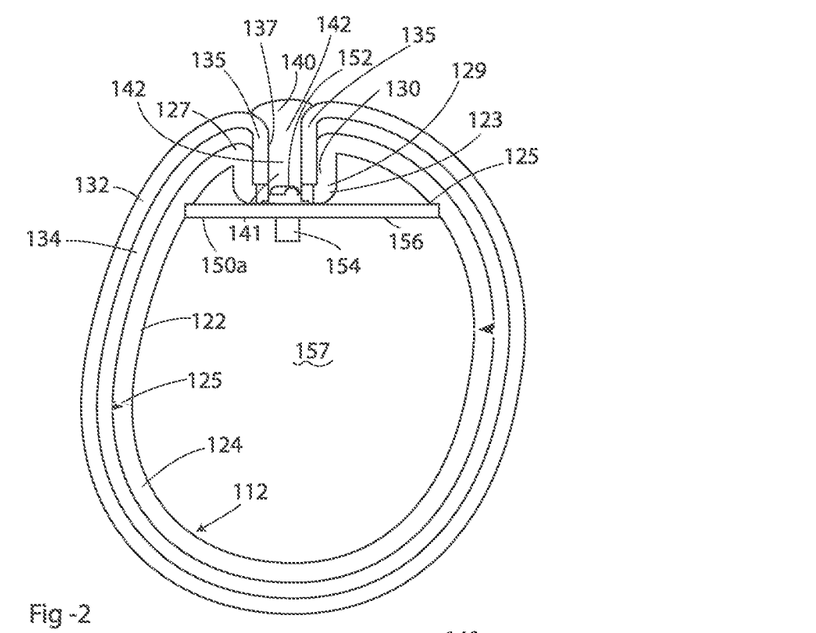
FIG. 2 is a cross-sectional view of a steering wheel having an armature rim that is split with a hollow interior.

FIG. 2 is a cross-sectional view through a fully assembled split rim steering wheel. FIG. 1 shows the general position of the section line for FIG. 2. Reference is again made to FIG. 1. Positioned behind the armature is an annular grouping of printed circuit boards generally referred to as interconnected chain of PCBs 150. In the preferred embodiment there are 10 interconnected PCBs 150a-150j. In general there can be "n" printed circuit boards. The PCBs in the rim of a steering wheel are electronically linked together and to one or more digital computer(s) or controllers 160. A plurality RGB (red green blue) LEDs are mounted on each of the printed circuit boards and transmit any color of light when energized by the computer/controller 160. Each LED is identified by numeral 152. Only three LEDs are shown on PCB 150a in FIG. 1. To achieve a constant visible color each LED 152 can be cycled on and off 50 times per sec. The computer 160 uses algorithms to provide safety information relating to vehicle conditions to aid in the safe control of the vehicle. The various components of steering wheel 102 are covered with an exterior leather covering 132 which may have an under layer of foam 134 as more readily seen in FIG. 2.

Reference is again made to FIG. 2. The two rim portions 122 and 124 can be seen joined together such as by a weld 125 or comparable mechanical connection. Depending upon the application, the rim portions can be made utilizing aluminum, steel or magnesium. In some applications a plastic rim may be acceptable. The annular slot 130 is formed by bending over opposing sections 127 and 129 of the top rim portion 122. In the embodiment shown the underside of the leather cover 132 has a foam layer 134. The leather and foam extend about the periphery of the rim 112 and the leather has facing edges 135. As can be seen the facing edges 135 extend downwardly on either side of slot 130. The lens 140 is pressed in between the slot 137 formed by the leather and positioned and secured in place. As illustrated lens 140 has a narrow portion 141 and an enlarged portion 142. The shape of the lens 140 will vary depending upon how the light from the LEDs is to illuminate the steering wheel.

Figures 4, 6:
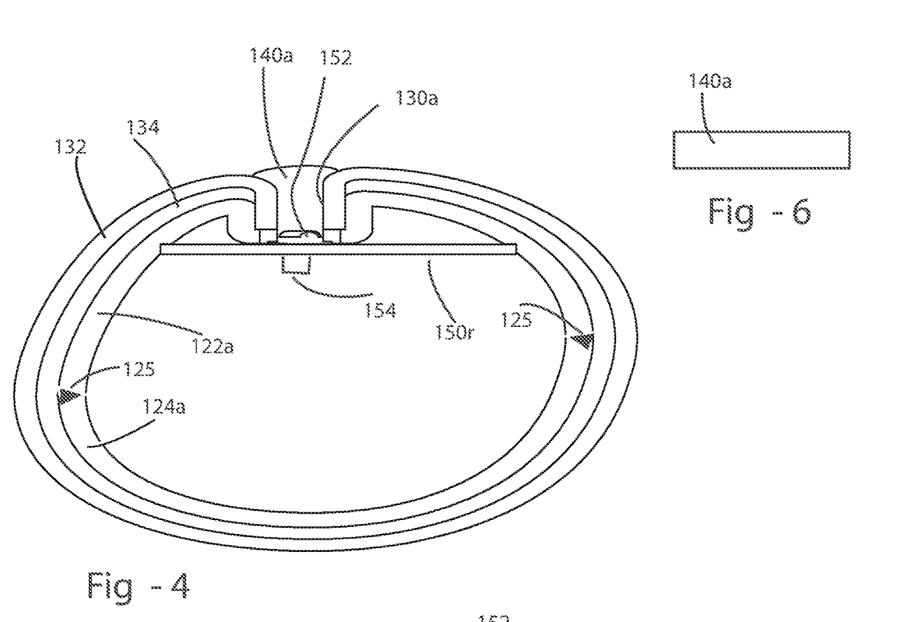
FIG. 4 diagrammatically shows a typical cross-sectional view through the spoke of a split rim, hollow steering wheel.
Figure 5:
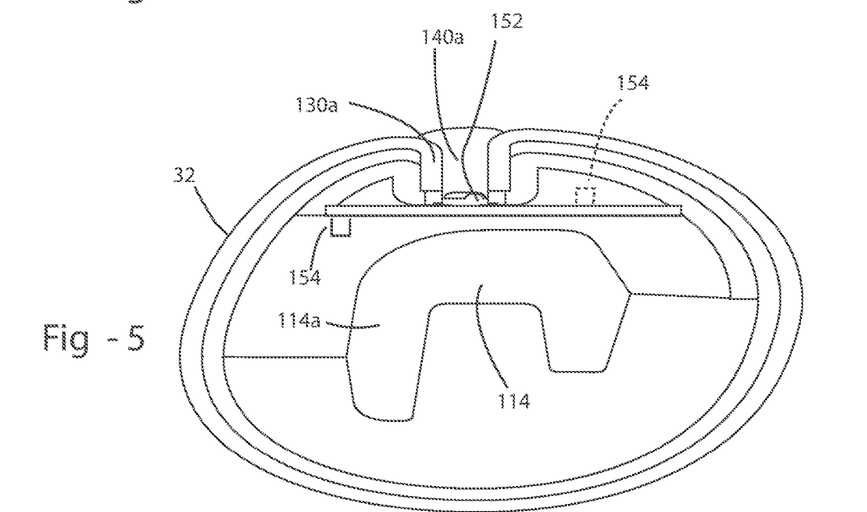
FIG. 5 diagrammatically illustrates a typical cross-sectional view through the spoke of the steering wheel having a solid armature.

As is known in the art of steering wheels, the spoke may be oval in shape with the minor diameter considerably smaller than the major diameter. This relationship is illustrated in FIGS. 4 and 5. The construction and assembly of various parts of the spoke 114 of a hollow spoke armature steering wheel are substantially the same as those comparable parts of the rim 112. FIG. 1 shows a plurality of PCBs 150s across each spoke 114. Each PCB 150s includes a number of LEDs as is the case with the LEDs used to illuminate the rim 112. The lens 140a extends across each spoke 114 and will generally follow the shape of the center of the spoke. The lens 140a can be secured within a slot 130a and inserted within a leather portion 132 if used. As illustrated the spoke 114 is generally of a rectangular shape and the illustrated lens 140a is also rectangular.

Each PCB board also can support a vibrator 154. The vibrator can be secured to any available location on a PCB. One typically available location is to connect the vibrator 154 to a bottom 156 of the PCB as illustrated in FIGS. 2-5. Any one of these plurality of vibrators can be switched on or off with a constant or variable amplitude to provide tactile feedback to the driver at determinable locations relative to the steering wheel and/or relative to a more absolute coordinate system such as relative to the passenger compartment, steering column, dashboard, straight ahead position. Likewise the vibrators could be used actively to decrease unwanted vibrations of the steering wheel rim and also to detect damping of the rim caused by the driver's hands and hence also detect the presence or otherwise of hands on the steering wheel.

Figure 3:
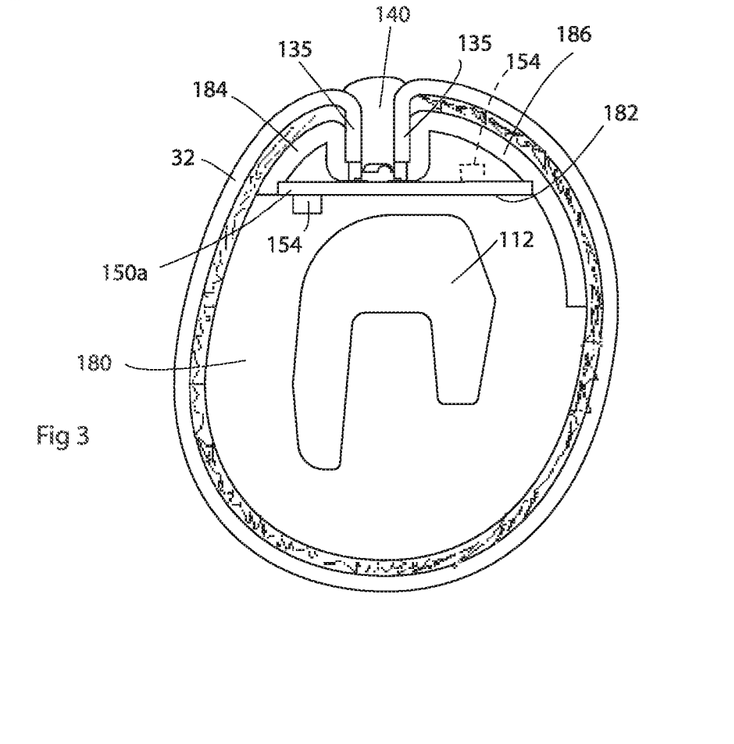
FIG. 3 shows another cross-sectional view through a steering wheel having a conventional solid armature rim.

FIGS. 3 and 5 show cross-sectional views of a steering wheel with a solid armature with the views taken across the rim (FIG. 3) and across the spoke (FIG. 5). In FIG. 3 the rim 114 is covered with an elastomer such as polyurethane 180. The top 182 of the elastomer 180 is formed as a flat surface. Extending from various locations of the elastomer 180 are elastomeric or metal curved rails 184 and 186 which form the annular slot 130. These rails are equivalent to portions 127 and 129 of the steering wheel in FIG. 2 which form the slot 130. The PCB board such as 150a is seated upon the top 182 of the elastomer 180. Depending upon space available the vibrator 154 can be located below the PCB board or on top of the board, which is the case of the steering wheel of FIG. 2.

The position of the LEDs in the rim and their absolute position in the vehicle is known to the computer for example by use of a steering wheel position or angle sensor 188 so that patterns of light can be created relative to the vehicle or relative to the steering wheel as appropriate.

Figure 6A:
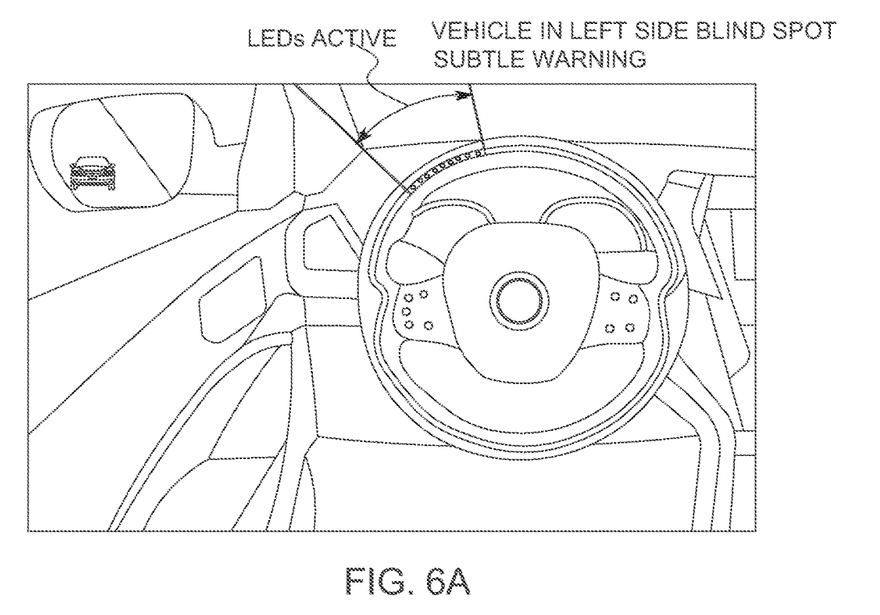
FIGS. 6a-6f show some of the features of the present invention.

Reference is made to FIGS. 6a-6f which show various features of the present invention. FIGS. 6a through 6f show the steering wheel with its plurality of LEDs distributed under the lens 140. In FIG. 1 the lens is shown as a smooth ring while in FIG. 6a-6f this lens 140 includes some contouring changes 200. In FIG. 6a a relatively small number of LEDs are activated to display a condition in which the driven vehicle has moved toward a right or left hand lane marker as sensed by the right and left hand lane sensors 300 or 302 or alternatively a vehicle is in the left blind spot of the driven vehicle. The blind spot is sensed by a blind spot detector 304 on the left side of the vehicle and 306 on the right-hand side of the vehicle. As there is no immediate emergency in the situation illustrated in FIG. 6a the choice of illumination can be a color that does not indicate an emergency, for example white or yellow.

Figure 6B:
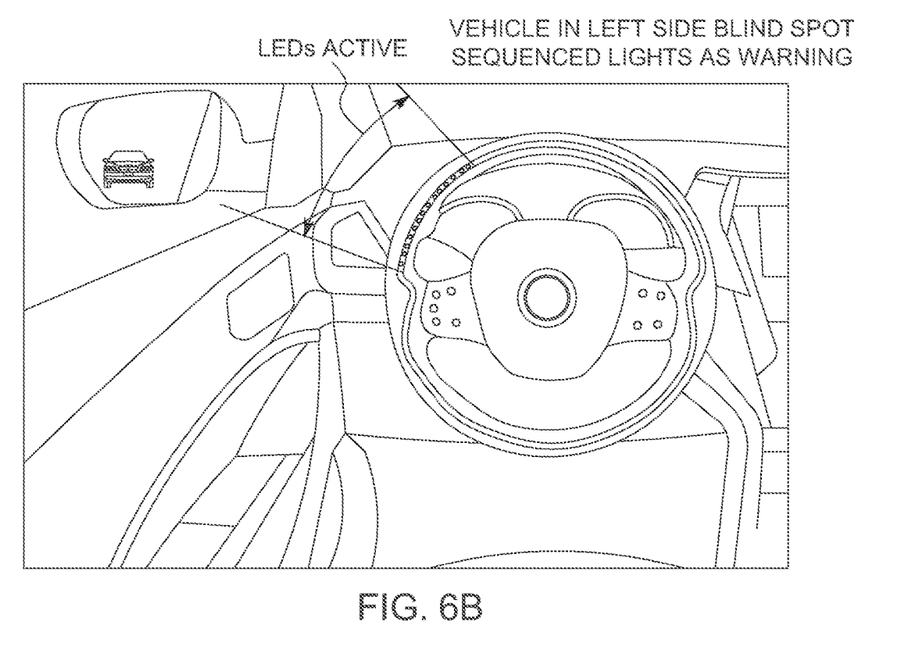
Figure 6C:
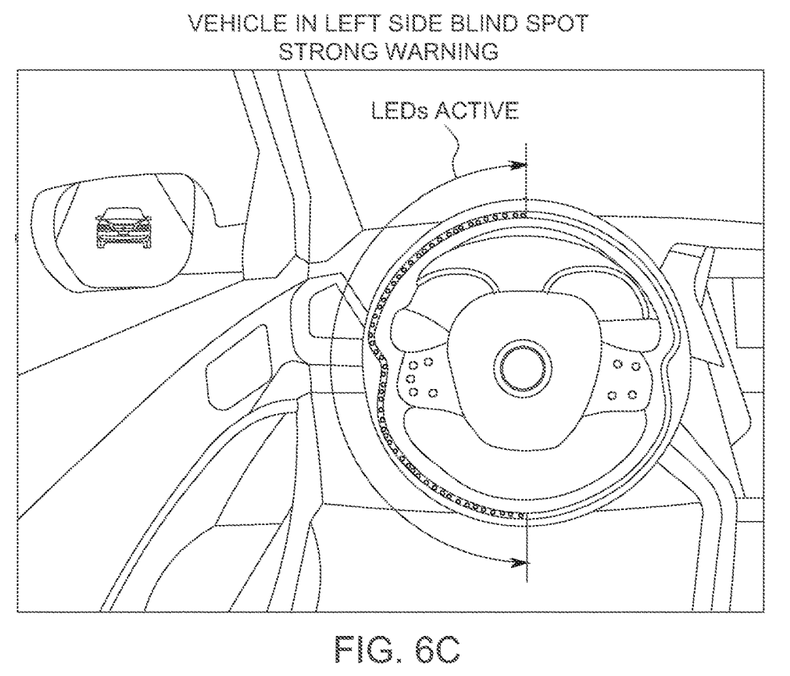

One of the benefits of the present invention is the illumination or warning signal is within the line of sight of the driver thereby the driver need not take his or her eyes off of the roadway to be informed of the emergency. As previously mentioned the LEDs 152 are distributed under the lens 140. FIG. 6b shows a very similar situation to that disclosed in FIG. 6a. However to provide more information to the driver activated LEDs are distributed over a larger region of the steering wheel in the left of center position. As can be seen alternating LEDs have been activated. Additionally, depending upon the severity of the impending emergency, rather than illuminating the LEDs with a constant color the LEDs in FIG. 6b can be illuminated in a pattern such as using serial manner indicating a vehicle may be in the driven vehicle's blind spot but closer to the driven vehicle, or alternatively the driven vehicle may be about to cross the left or right hand lane marker. FIG. 6c further shows additional benefits of the present invention. In this condition let us assume another vehicle is in the driven vehicle's blind spot but extremely close to the driven vehicle, in this matter the LEDs in a larger segment of the steering wheel such as one half of the steering wheel can be activated with an appropriate color or with an appropriate elimination pattern such as blinking on or off or being activated in the serial manner as mentioned above. It is contemplated that in such an emergency the LEDs would be activated to produce an intense red color clearly indicating to the driver the potential emergency of the situation.

Figure 6D:
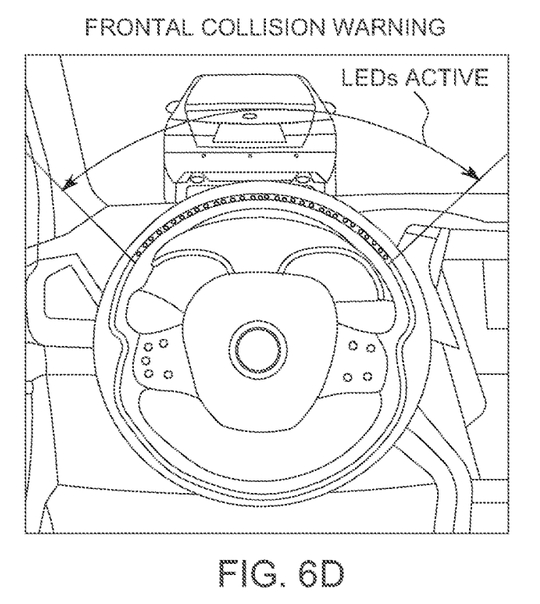

An inspection of FIG. 6d shows another vehicle in front of the driven vehicle. Based upon vehicle speed as sensed by sensor 312 and whether or not the collision avoidance sensor or system 310 is activated an emergency signal needs to be communicated to the driver of the driven vehicle. In this situation the LEDs spanning a large upper sector of the steering wheel, for example from the 10 o'clock to the 2 o'clock position, will be illuminated in red (or some other color) to show the severity of the potential crash. A constant or blinking pattern can be used.

Figure 6E:
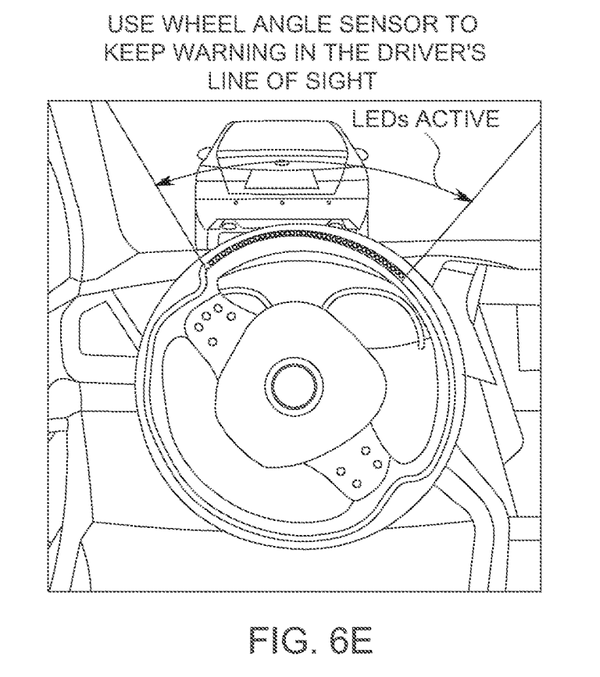

In FIG. 6e the driven vehicle is in a turn as can be seen by the movement of the steering wheel to the right. Positioned in front of the now turning driven vehicle is another vehicle. If this other vehicle and the speed of the driven vehicle are such that a crash is pending the system will again generate the LED indications which may span the 10 o'clock to 2 o'clock positions but here the LED illumination is not relative to the position of the steering wheel but is relative to a more absolute coordinate system, for example the coordinate system of the passenger compartment or a coordinate system based upon the steering wheel which does not rotate or other such coordinate system to enable the illuminate to remain at a top portion of the rotated steering wheel. The examples above referred to the left hand blind spot; the system can react to vehicles in the right or left hand blind spot.

Figure 6F:
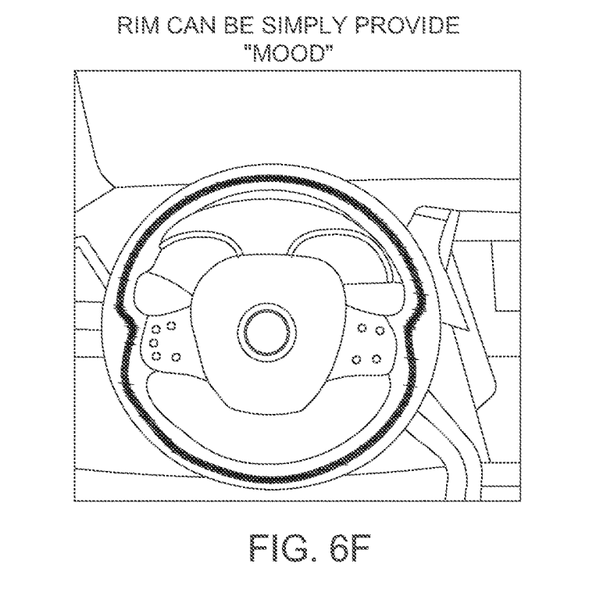

Finally, one of the inherent benefits of the present invention is not that of announcing to the driver an impending dangerous situation. In FIG. 6f all or some of the LEDs are illuminated to simply set the tone or mood of the situation. In this case the eliminated color may be one of blue, purple or other soothing color.

Many changes and modifications in the above-described embodiment of the invention can, of course, be carried out without departing from the scope thereof. Accordingly, that scope is intended to be limited only by the scope of the appended claims.

The invention claimed is:

1. A steering wheel (102) having a hub portion (118), a rim (112) and at least one spoke (114) connected to the hub portion (118) and to the rim (112), the rim (112) being hollow and made of a top or first portion (122) and bottom or second portion (124) having an annular groove or slot and a top surface of the top or first portion of the steering wheel; a number of actuatable light sources located in or under the annular groove or slot; an annular light diffuser or lens (140) positioned in the annular groove or slot above the light sources, and the lens (140) follows the shape of the annular groove or slot, the lens being a translucent or transparent material covered with a thin layer of aluminum or chrome which permits the transmission of light;
   at least one vibrator (154) which when activated creates an informational signal for the driver; and
   a controller (160) to activate the light sources, wherein a pattern or sequence of activating the light sources is chosen to provide an informational signal, which signal includes a warning signal to a driver, wherein illumination of the light source can remain at the top portion of the steering wheel in a driver's field of vision when the steering wheel is being rotated.

2. The steering wheel (102) according to claim 1 wherein the annular groove or slot substantially extends about the periphery of the top surface.

3. The steering wheel (102) according to claim 1 wherein each light source is an LED (152), with a predetermined number of LEDs secured to a circuit board (150).

4. The steering wheel (102) according to claim 3 wherein each circuit board (150) has a mounting surface upon which electrical components can be mounted, the mounting surface having a curved top edge and a curved lower edge.

5. The steering wheel (102) according to claim 1 wherein each vibrator is connected to a printed circuit board, PCB (150), which extends across each spoke (114).

6. The steering wheel (102) according to claim 1 wherein the vibrators can detect damping of the vibrations in the steering wheel caused by the hands of a driver.

7. The steering wheel (102) according to claim 1 wherein the vibrators can sense the presence of a driver's hands on the steering wheel.

* * * * *